(12) United States Patent
Thomas et al.

(10) Patent No.: US 9,051,731 B2
(45) Date of Patent: Jun. 9, 2015

(54) ACOUSTICAL DOOR STRUCTURE (71) Applicant: Georgia-Pacific Gypsum LLC, Atlanta, GA (US)

(72) Inventors: Vincent B. Thomas, Bogart, GA (US); Steven D. Brown, Fayetteville, GA (US); Scott J. Abolt, Cuba, MO (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 0 days.

(21) Appl. No.: 13/964,588

(22) Filed: Aug. 12, 2013

(65) Prior Publication Data

US 2014/0054107 A1    Feb. 27, 2014

Related U.S. Application Data

(60) Provisional application No. 61/692,095, filed on Aug. 22, 2012.

(51) Int. Cl.
| | | |
|---|---|---|
| *E04B 1/84* | (2006.01) | |
| *E06B 5/20* | (2006.01) | |
| *B32B 21/02* | (2006.01) | |
| *E06B 3/70* | (2006.01) | |
| *E06B 5/16* | (2006.01) | |
| *B32B 5/02* | (2006.01) | |
| *B32B 5/18* | (2006.01) | |
| *B32B 7/12* | (2006.01) | |
| *B32B 15/04* | (2006.01) | |

(Continued)

(52) U.S. Cl.
CPC ... *E04B 1/84* (2013.01); *E06B 5/20* (2013.01); *B32B 21/02* (2013.01); *E06B 3/7015* (2013.01); *E06B 3/7017* (2013.01); *E06B 5/16* (2013.01); *E06B 2003/7028* (2013.01); *E06B 2003/7032* (2013.01); *E06B 2003/7042* (2013.01); *E06B 2003/7051* (2013.01); *B32B 5/024* (2013.01); *B32B 5/18* (2013.01); *B32B 7/12* (2013.01); *B32B 15/04* (2013.01); *B32B 21/042* (2013.01); *B32B 25/04* (2013.01); *B32B 27/02* (2013.01); *B32B 27/32* (2013.01); *B32B 27/40* (2013.01); *B32B 2262/0276* (2013.01); *B32B 2262/101* (2013.01); *B32B 2262/105* (2013.01); *B32B 2307/102* (2013.01); *B32B 2307/3065* (2013.01); *B32B 2419/00* (2013.01)

(58) Field of Classification Search
CPC ..... E06B 5/20; E06B 5/16; E04B 2001/8423; E04B 2001/8452; E04B 1/84
USPC ......................................... 181/287, 290, 292
See application file for complete search history.

(56) References Cited

U.S. PATENT DOCUMENTS 2,363,068 A * 11/1944 Leadbetter .................... 181/292
3,168,763 A *  2/1965 Gilbert ........................... 428/45
(Continued)

OTHER PUBLICATIONS

International Search Report and Written Opinion for PCT/US2013/054519 mailed Nov. 12, 2013.

*Primary Examiner* — Jeremy Luks
(74) *Attorney, Agent, or Firm* — Ram W. Sabnis (57) ABSTRACT

A door structure is provided having two outer dampening layers, each outer dampening layer having a base surface and a damping surface, and an inner compartmentalized layer adjacent to the damping surfaces of the two outer dampening layers, the inner compartmentalized layer includes at least two compartments, wherein the damping surfaces of the two outer dampening layers are substantially unconstrained relative to the inner compartmentalized layer such that the damping surfaces are deformable.

29 Claims, 4 Drawing Sheets

(51) Int. Cl.
*B32B 21/04* (2006.01)
*B32B 25/04* (2006.01)
*B32B 27/02* (2006.01)
*B32B 27/32* (2006.01)
*B32B 27/40* (2006.01)

(56) References Cited

U.S. PATENT DOCUMENTS

| | | | |
|---|---|---|---|
| 3,629,046 A * | 12/1971 | Gilbert | 428/71 |
| 4,924,969 A * | 5/1990 | L'Heureux | 181/290 |
| 5,695,867 A | 12/1997 | Saitoh et al. | |
| 5,945,208 A | 8/1999 | Richards et al. | |
| 6,119,807 A | 9/2000 | Benson, Jr. et al. | |
| 6,789,645 B1 * | 9/2004 | Deblander | 181/290 |
| 7,871,947 B2 | 1/2011 | Flack | |
| 7,909,136 B2 | 3/2011 | Surace et al. | |
| 7,921,965 B1 | 4/2011 | Surace | |
| 8,176,682 B2 * | 5/2012 | Gaviglia | 49/501 |
| 2005/0126848 A1 | 6/2005 | Siavoshai et al. | |
| 2006/0057345 A1 | 3/2006 | Surace et al. | |

* cited by examiner

ACOUSTICAL DOOR STRUCTURE

CROSS-REFERENCES TO RELATED APPLICATIONS

This application claims priority to U.S. Provisional Application No. 61/692,095, filed Aug. 22, 2012, which is incorporated herein by reference.

BACKGROUND

The present invention relates generally to the field of doors, and more particularly to door structures having improved sound attenuation properties and extended fire ratings.

Doors with enhanced acoustical ratings are used to minimize noise in buildings such as condominiums, school classrooms, defense installations, theaters, etc. Typically, the sound ratings for these doors are relatively low, e.g., less than 32 Sound Transmission Class (STC) rating, due to the natural resonance frequency of materials and design used to construct doors. Various attempts have been made to improve the sound ratings of doors. For example, doors having a laminated surface and internal air space have been developed. However, the sound attenuation properties of such door structures are limited by the size of the air space.

Steel doors, which may display sound ratings greater than 45 STC, are commonly used for acoustical purposes. Steel doors are also more likely to carry fire ratings than combustible material doors. However, steel significantly increases the weight of the door.

Thus, the STC rating one can reasonably achieve in a normal 1.75" thick door having a reasonable weight, e.g., less than about 200 lbs., and preferably less than about 175 lbs., is limited. Accordingly, there is a need for door structures having improved sound attenuation properties and extended fire ratings.

SUMMARY

In one aspect, a door structure is provided. The door structure includes two outer dampening layers, each outer dampening layer having a base surface and a damping surface, and an inner compartmentalized layer adjacent to the damping surfaces of the two outer dampening layers. The inner compartmentalized layer includes at least two compartments. The damping surfaces of the two outer dampening layers are substantially unconstrained relative to the inner compartmentalized layer such that the damping surfaces are deformable.

In another aspect, a door is provided. The door includes two door skins and two outer dampening layers. Each outer dampening layer has a base surface facing one of the two door skins, and a damping surface. The door also includes an inner compartmentalized layer adjacent to the damping surfaces of the two outer dampening layers. The inner compartmentalized layer includes at least two compartments separated by at least one rail. The damping surfaces of the two outer dampening layers are substantially unconstrained relative to the inner compartmentalized layer such that the damping surfaces are deformable.

BRIEF DESCRIPTION OF THE DRAWINGS

Referring now to the drawings, which are meant to be exemplary and not limiting, and wherein like elements are numbered alike.

DETAILED DESCRIPTION

Disclosed herein are doors and door structures having improved sound attenuation properties and extended fire ratings. The doors and structures include an inner compartmentalized layer and two dampening layers each having a damping surface adjacent the inner compartmentalized layer and substantially unconstrained relative to the inner compartmentalized layer such that a damping surfaces are deformable. As used herein, the term "adjacent" refers to the damping surfaces facing and being substantially contiguous with the inner compartmentalized layer. As used herein, the term "substantially unconstrained" refers to the damping surface being generally not affixed to the inner compartmentalized layer. For example, the damping surface may not be adhered or otherwise connected to the adjacent inner compartmentalized layer. As used herein, the term "deformable" refers to the damping surface being free to move, expand, and compress as a result of vibrational sound stresses and flexural stresses of the dampening layer.

In certain embodiments, the door structure is selected from the group consisting of wood doors, wood flush doors, wood stile and rail doors, fiberglass doors, composite doors, and metal doors.

Figure 2:
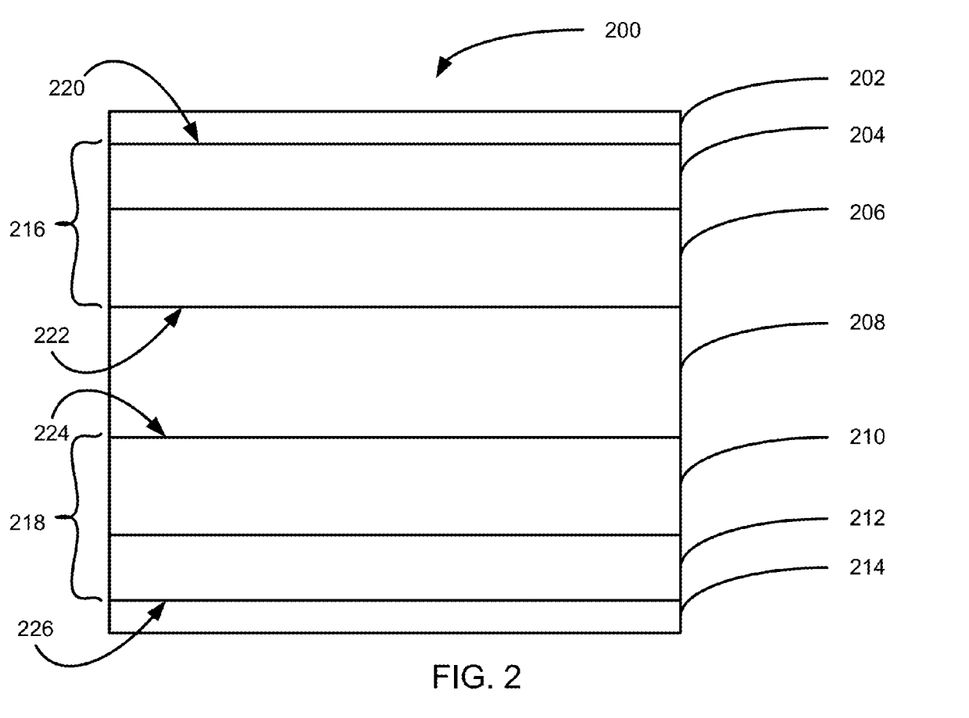
FIG. 2 is a cross-sectional view of an embodiment of a door structure having two outer dampening layers and an inner compartmentalized layer.

As shown in FIG. 2, the door structure 200 has two outer dampening layers 216, 218, each dampening layer having a base surface 220, 226 and a damping surface 222, 224. The door structure 200 has an inner compartmentalized layer 208 adjacent to the damping surfaces 222, 224 of the two outer dampening layers 216, 218. The damping surfaces 222, 224 of the two outer dampening layers 216, 218 are substantially unconstrained relative to the inner compartmentalized layer 208 such that the damping surfaces 222, 224 are deformable.

In certain embodiments, each outer dampening layer 216, 218 includes a dampening material. For example, the dampening material may be selected from the group consisting of sheet mass loaded vinyl, lead, polyalkylene ether glycol, vinyl esters, polyolefin, polyesters, and any combination thereof. In certain embodiments, the two outer dampening layers 216, 218 each include a base layer 204, 212 having a base surface 220, 226 and a damping material layer 206, 210 having a damping surface 222, 224.

In certain embodiments, two door skins 202, 214 are included at the exterior surface of door structure 200. For example, a 2-ply wood veneer (e.g., medium density fiberboard cross band with wood veneer, high density fiberboard, hardboard, high pressure laminate, fiberglass reinforced plastics or composite) skin 202, 214 may be applied to the surfaces of the core 208, 216, 218.

For example, the outer dampening layer may include a base layer of high density firestop (Firestop, aka FIREDEFENDER, sold by Georgia-Pacific, Atlanta, Ga. is a fire resistant building material which may include at least about 65 percent by weight of calcium sulfate dehydrate, hemihydrate or anhydrous gypsum and at least about 7 percent by weight of paper pulp) or medium density fiberboard and a damping material layer of mass loaded vinyl. For example, the medium density fiberboard may be relatively dense with a weight of from about 46 to about 62 pounds per cubic foot, and stiff with a Young's Modulus from about 350,000 to about 600,000 psi. In one embodiment, the medium density fiberboard has a density of about 48 pounds per cubic foot and a Young's Modulus of about 366,098 psi. For example, the high density firestop may be relatively dense with a density from about 61 to about 85 pounds per cubic foot, and stiff with a Young's Modulus from about 630,000 to about 900,000 psi. In one embodiment, the high density firestop has a Young's Modulus of about 783,208 psi. In one embodiment, the mass loaded vinyl weighs from about 1 pound per square foot to about 2.2 pounds per square foot. The mass loaded vinyl may be loaded with a high molecular density material such as barium sulfate, calcium silicate, or lead. The mass loaded vinyl may be relatively dense and limp, with a Young's Modulus of from about 10,000 to about 18,000 psi. In one embodiment, the mass loaded vinyl has a Young's Modulus of about 14,000 psi.

In certain embodiments, the base layer is rigidly connected to the damping material layer at surfaces opposite the base and damping surfaces. For example, the base layer may be rigidly connected to the damping material layer by an adhesive. The adhesive may be selected from the group consisting of natural base adhesives, hot melt adhesives, thermosetting adhesives, polyisocyanate, epoxy, cyanoacrylate, polyvinyl acetate, and any combination thereof. For example, the hot melt adhesive may be selected from the group consisting of polyurethane, polyethylene, polypropylene, polyamides, polyester, polyisocyanate, ethyl vinyl acetate, and any combination thereof. In one embodiment, the hot melt adhesive is a hot melt polyurethane.

Without being bound by a particular theory, it is believed that the dampening layers will initially resist flexing when exposed to sound vibration because of the weight of the dampening layers. However, at lower frequencies where there is sufficient energy in wave form to cause the dampening layers to move, the dampening layers will deform with bending stresses. As vibrational stresses cause the dampening layers to move, energy is dissipated as a result of expansion and compression of the damping material layer under flexural stresses of the base layer. The dampening effect increases as the thickness of the damping material layer increases and as the Young's Modulus and flexural rigidity of the base layer is increased. The base layer is rigidly connected to the damping material layer to maximize the energy dissipated in the damping material layer through flexural stresses.

In certain embodiments, each of the at least two compartments of the inner compartmentalized layer contains a batting material. For example, the batting material may be selected from the group consisting of fibers, polyester fibers, fiberglass insulation, rock wool, nonwoven aramid, ceramic fiber matts, nonwoven matts, loose fill materials, vermiculite, expanded perlite, cellulose, glass, foams, fiberglass, thermosets, polystyrene, polyurethane, polyolefins, metal, kraft honeycomb, plastic, rubber, and any combination thereof. In one embodiment, the batting material includes a cotton batting. In other embodiment, the cotton batting is selected from the group consisting of cotton, jute, bamboo, ramie, hemp, linin, acrylic and rayon. In certain embodiments, the compartments are tightly packed with the batting material. In one embodiment, the batting material is present in the at least two compartments in an amount of about 3 pounds per cubic foot to about 6 pounds per cubic foot. In one embodiment, the batting material is ½" thick and 4.5 pounds per cubic foot.

Without being bound by a particular theory, it is believed that the batting material serves to scatter and redirect sound energy and forms a trap for a broad range of acoustical wavelengths. The batting material may be composed of a low loft, heavy, dense fiber-type material with a relatively high percentage of the total volume composed of air space. The air spaces are believed effective at capturing mid to high frequency wavelengths and converting sound energy into heat via friction.

Figure 1:
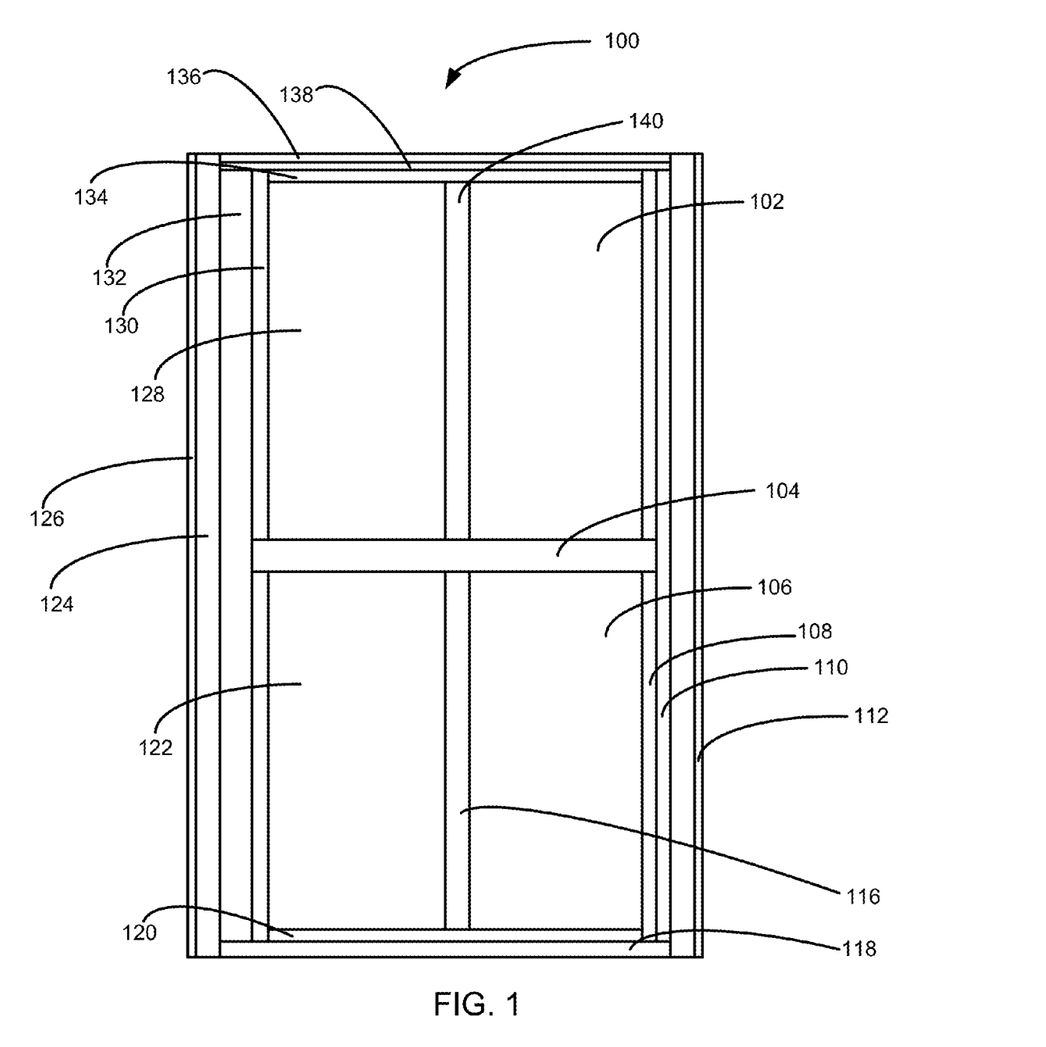
FIG. 1 is a plan view of an embodiment of a door structure having an inner compartmentalized layer with four compartments.

As shown in FIG. 1, the inner compartmentalized layer is formed by the inner, top, and bottom rails and stiles 134, 108, 120, 130 and the compartments are formed by rails 140, 116, 104. Without being bound by a particular theory, it is believed the inner compartmentalized layer allows for the absorption of long sound wavelengths over a short air space depth.

For example, the inside stiles and top, bottom, and mid rails may be lined with either ½" thick mdf and/or ½" thick firestop. Firestop generally is a fire resistant building material having excellent machinability and physical and mechanical properties, including high screw holding. For example, firestop may include at least about 65 percent by weight calcium sulfate dihydrate, derived from hemihydrate or anhydrous gypsum, and at least about 7 percent by weight paper pulp. For example, the firestop may be FIREDEFENDER (sold by Georgia Pacific of Atlanta, Ga.).

In one embodiment, a 5-inch mid rail runs across the width of the doors at mid-span, and provides stability while dividing the core into two separate compartments. In certain embodiments, the two compartments can be further divided up into smaller, equally-sized chambers with 2-inch thick, ½" depth runners which are glued in place with hot melt adhesive. The compartments may range in size from small chambers of approximately ⅜" diameter or larger. In certain embodiments, the compartments are square and are from approximately 4 square inches (2"×2") to approximately 385 square inches (11"×35"). The compartments may be sized, or tuned, for the sound frequencies to be absorbed.

Without being bound by a particular theory, it is believed that deeper compartments (up to 1 inch depth) with smaller overall areas (e.g., ⅜" to 6" diameter) are more effective as a bass trap. However, compartments used in conjunction with the unconstrained dampening region may be larger to maximize the effect of the damping material as it flexes and compresses.

In certain embodiments, the door structure has a sound rating between about 40 Sound Transmission Class (STC) and about 55 STC. For example, the door structure may have a sound rating between about 41 STC and about 50 STC, or between about 42 STC and about 48 STC. STC may be measured in accordance with ASTM E 90-09, "Standard Test Method for Laboratory Measurement of Airborne Sound Transmission Loss of Building Partitions," ASTM E 413-10, "Classification for Rating Sound Insulation," ASTM E 1332-10a, "Standard Classification for Rating Outdoor-Indoor Sound Attenuation," and ASTM E 2235-04, "Standard Test Method for Determination of Decay Rates for Use in Sound Insulation Test Methods."

The door structure may also have an extended fire rating. For example, the door structure may have a 20-minute, 45-minute, 60-minute or 90-minute positive pressure rating when tested according to NFPA 252 (2008), CAN 5104 (1985), and UL 10C (2009) "Positive Pressure Fire Tests of Door Assemblies."

For example, the present disclosure provides for higher STC ratings per weight than what can currently be achieved with wood doors. Additionally, the presently disclosed doors generally display a lower overall weight than typical acoustical steel doors, which generally weigh between 10 and 20 pounds per square foot.

As shown in FIG. 1, a door 100 is provided having at least two compartments 102, 106, 122, 128 separated by at least one rail 104, 116, 140. In certain embodiments, the door also includes a top rail 134, a bottom rail 120, and two side rails 108, 130 that border the inner compartmentalized layer 102, 106, 122, 128. In certain embodiments, the at least one rail includes high density firestop or medium density fiberboard.

In certain embodiments, as shown in FIG. 1, door 100 has a banded fire core structure including a mineral core, such as gypsum or perlite, surrounded by rails and stiles 110, 118, 124, 132, 138 composed of a rigid high density material, such as firestop. The mineral core generally reduces the weight of the overall assembly while the firestop rails increase flexural rigidity and provide structural support and a means of machining and attaching door hardware. The rails at the top and stiles on the edges may contain a laminated piece of intumescent (e.g., about 2 mm thickness) to expand and seal the door leaf edges during a fire to slow the spread of the fire. The intumescent, for example PALUSOL (sold by BASF of Ludwigshagen, Germany) or TECNOFIRE 2000 (sold by Technical Fibre Products of Cumbria, United Kingdom), may be concealed by a ½" wooden stile backer 112, 126, 136. The intumescent may include a solid sheet of hydrated sodium silicate compound, reinforced with glass fibers and coated on both sides with a film of epoxy resin. Alternatively, the intumescent may include a graphite compound in a matrix of epoxy resin, reinforced with mineral fibers and molded into a rigid sheet. The intumescent may expand between about 220° F. and about 392° F., with a rate of expansion between about 5:1 and about 22:1, depending on thickness.

Figure 3:
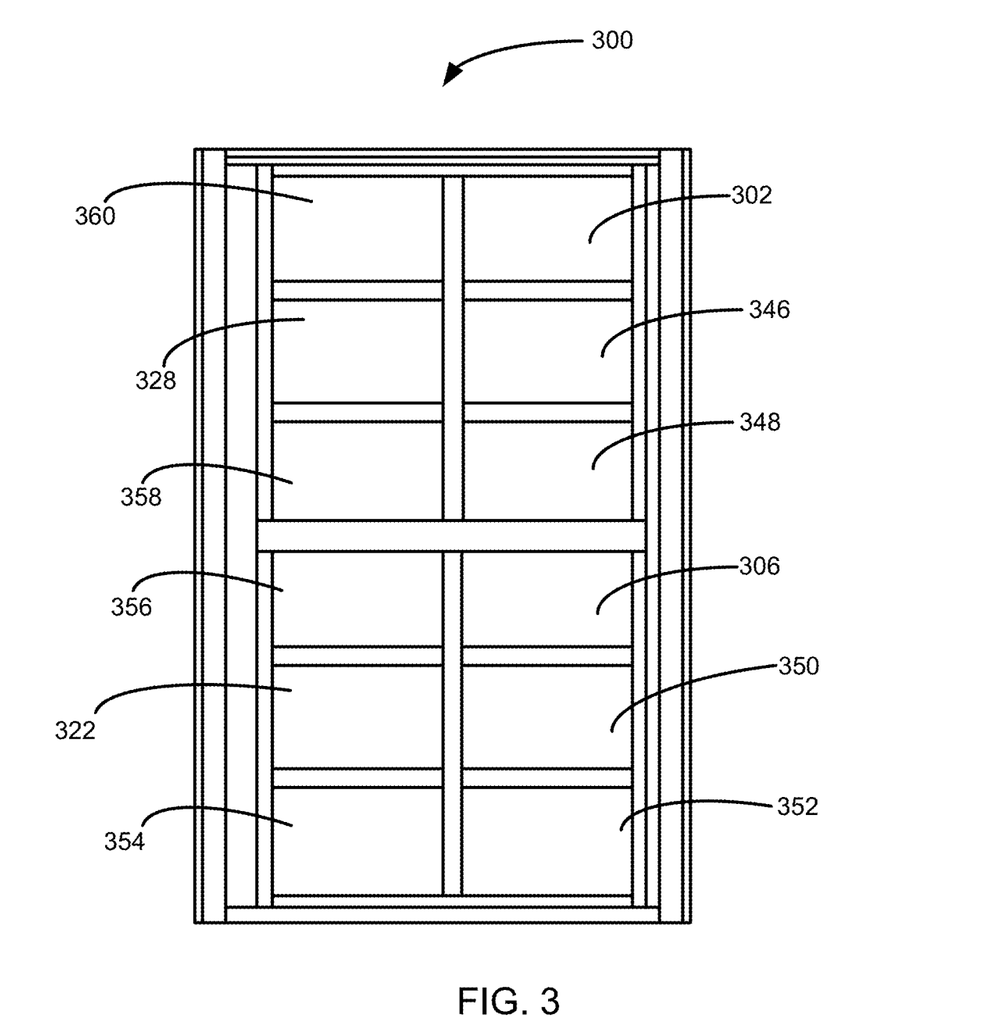
FIG. 3 is a plan view of an embodiment of a door structure having an inner compartmentalized layer with twelve compartments.

In certain embodiments, the door may have four, eight, twelve, or another number of compartments in the inner compartmentalized layer. The compartments may be separated by one or more rails. As shown in FIG. 1, the door has four compartments 102, 106, 122, 128 separated by three rails, 104, 116, 140. As shown in FIG. 3, the door 300 has twelve compartments 302, 306, 322, 328, 346, 348, 350, 352, 354, 356, 358, 360.

In certain embodiments, the door has a weight of between about 7.8 pounds per square foot and about 10.1 pounds per square foot.

EXAMPLES

Figure 4:
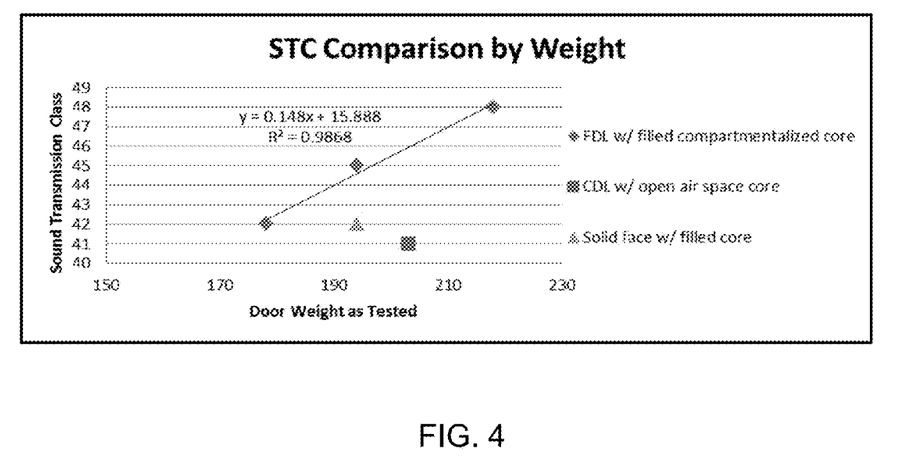
FIG. 4 is a chart illustrating the comparative STC by weight of embodiments of door structures in accordance with the present disclosure and alternative door structures.

Embodiments of the door structures disclosed herein were constructed and tested for sound attenuation properties. The results are shown in FIG. 4.

Three doors having unconstrained dampening layers (i.e., free dampening layers (FDL)) made of high density firestop or medium density fiberboard (mdf) and mass loaded vinyl (mlv) were constructed in accordance with the present disclosure. The inner compartmentalized cores were each divided into four compartments having cotton batting glued therein.

The first door had an unconstrained dampening layer made of mdf and mlv weighing 1 pound per square foot. The first door weighed 178 pounds with hardware and displayed an STC of 42.

The second door had an unconstrained dampening layer made of mdf and mlv weighing 2 pounds per square foot. The second door weighed 194 pounds with hardware and displayed an STC of 45.

The third door had an unconstrained dampening layer made of high density firestop and mlv weighing 2 pounds per square foot. The third door weighed 218 pounds with hardware and displayed an STC of 48.

Two comparison doors were constructed. The first comparison door was constructed to have a constrained dampening layer (CDL) made up of PALUSOL Type 100 fireboard and high density firestop having a viscoelastic adhesive therebetween. A ½" firestop runner was used to create top, bottom, and side rails to form a ½-inch, undivided inner air space layer. The first comparison door weighed 203 pounds with hardware and displayed an STC of 41.

The second comparison door was constructed with a solid panel of high density firestop on either side of an inner air space. The inner air space was compartmentalized into two compartments containing cotton batting fiber laminated to the firestop. The second comparison door weighed 194 pounds with hardware and displayed an STC of 42.

FIG. 4 shows a graph of the results of the results of these tests. Each of the five doors is represented by Sound Transmission Class (STC) as a function of door weight with hardware (in pounds). Overall, the door structures having an unconstrained dampening layer and a filled compartmentalized core showed an improved STC rating compared to other doors at the same weight.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A door structure, comprising:
   two outer dampening layers, each outer dampening layer comprising a base layer having a base surface and a damping material layer having a damping surface; and
   an inner compartmentalized layer adjacent to the damping surfaces of the two outer dampening layers, the inner compartmentalized layer comprising at least two compartments,
   wherein the base layer has a Young's Modulus of from about 350,000 psi to about 600,000 psi and the damping material layer has a Young's Modulus of from about 10,000 psi to about 18,000 psi,
   wherein the damping material layer comprises mass loaded vinyl in an amount of from about 1 pound per square foot to about 2.2 pounds per square foot.

2. The door structure of claim 1, wherein the door structure comprises a door selected from the group consisting of wood doors, wood flush doors, wood stile and rail doors, fiberglass doors, composite doors, and metal doors.

3. The door structure of claim 1, wherein the base layer is rigidly connected to the damping material layer at surfaces opposite the base and damping surfaces.

4. The door structure of claim 3, wherein the base layer is rigidly connected to the damping material layer by an adhesive.

5. The door structure of claim 4, wherein the adhesive is selected from the group consisting of natural base adhesives, hot melt adhesives, thermosetting adhesives, polyisocyanate, epoxy, cyanoacrylate, polyvinyl acetate, and any combination thereof.

6. The door structure of claim 5, wherein the hot melt adhesive is selected from the group consisting of polyurethane, polyethylene, polypropylene, polyamides, polyester, polyisocyanate, ethyl vinyl acetate, and any combination thereof.

7. The door structure of claim 5, wherein the hot melt adhesive comprises a hot melt polyurethane.

8. The door structure of claim 1, wherein each base layer comprises a layer of high density firestop or medium density fiberboard.

9. The door structure of claim 1, wherein the door structure has a sound rating between about 40 STC and about 55 STC.

10. The door structure of claim 1, wherein the door structure has a sound rating between about 41 STC and about 50 STC.

11. The door structure of claim 1, wherein the door structure has a sound rating between about 42 STC and about 48 STC.

12. The door structure of claim 1, wherein each of the at least two compartments comprises a batting material.

13. The door structure of claim 12, wherein the batting material is selected from the group consisting of fibers, polyester fibers, fiberglass insulation, rock wool, nonwoven aramid, ceramic fiber matts, nonwoven matts, loose fill materials, vermiculite, expanded perlite, cellulose, glass, foams, fiberglass, thermosets, polystyrene, polyurethane, polyolefins, metal, kraft honeycomb, plastic, rubber, and any combination thereof.

14. The door structure of claim 12, wherein the batting material comprises a cotton batting.

15. The door structure of claim 12, wherein the cotton batting is selected from the group consisting of cotton, jute, bamboo, ramie, hemp, linin, acrylic and rayon.

16. The door structure of claim 12, wherein the batting material is present in the at least two compartments in an amount from about 3 pounds per cubic foot to about 6 pounds per cubic foot.

17. The door structure of claim 1, wherein the inner compartmentalized layer comprises four compartments.

18. The door structure of claim 1, wherein the inner compartmentalized layer comprises twelve compartments.

19. A door structure, comprising:
an outer dampening layer comprising a base layer having a base surface and a damping material layer having a damping surface; and
an inner compartmentalized layer adjacent to the damping surface of the outer dampening layer,
wherein the base layer has a Young's Modulus of from about 350,000 psi to about 600,000 psi and the damping material layer has a Young's Modulus of from about 10,000 psi to about 18,000 psi,
wherein the damping material layer comprises mass loaded vinyl in an amount of from about 1 pound per square foot to about 2.2 pounds per square foot.

20. The door structure of claim 19, wherein the door structure comprises a door selected from the group consisting of wood doors, wood flush doors, wood stile and rail doors, fiberglass doors, composite doors, and metal doors.

21. The door structure of claim 19, wherein the base layer is rigidly connected to the damping material layer at a surface opposite the base and damping surfaces.

22. The door structure of claim 21, wherein the base layer is rigidly connected to the damping material layer by an adhesive.

23. The door structure of claim 22, wherein the adhesive is selected from the group consisting of natural base adhesives, hot melt adhesives, thermosetting adhesives, polyisocyanate, epoxy, cyanoacrylate, polyvinyl acetate, and any combination thereof.

24. The door structure of claim 23, wherein the hot melt adhesive is selected from the group consisting of polyurethane, polyethylene, polypropylene, polyamides, polyester, polyisocyanate, ethyl vinyl acetate, and any combination thereof.

25. The door structure of claim 23, wherein the hot melt adhesive comprises a hot melt polyurethane.

26. The door structure of claim 19, wherein the base layer comprises layer of high density firestop or medium density fiberboard.

27. The door structure of claim 19, wherein the door structure has a sound rating between about 40 STC and about 55 STC.

28. The door structure of claim 19, wherein the inner compartmentalized layer comprises at least two compartments, each of the at least two compartments comprising a batting material.

29. The door structure of claim 28, wherein the batting material is present in the at least two compartments in an amount from about 3 pounds per cubic foot to about 6 pounds per cubic foot.

* * * * *

UNITED STATES PATENT AND TRADEMARK OFFICE
CERTIFICATE OF CORRECTION

| | | |
|---|---|---|
| PATENT NO. | : 9,051,731 B2 | Page 1 of 1 |
| APPLICATION NO. | : 13/964588 | |
| DATED | : June 9, 2015 | |
| INVENTOR(S) | : Vincent B. Thomas et al. | |

It is certified that error appears in the above-identified patent and that said Letters Patent is hereby corrected as shown below:

In the claims

At column 7, line 32, change "12" to --14--.

Signed and Sealed this
Thirteenth Day of October, 2015

Michelle K. Lee
*Director of the United States Patent and Trademark Office*